(12) United States Patent
Vetter

(10) Patent No.: US 6,850,920 B2
(45) Date of Patent: Feb. 1, 2005

(54) PERFORMANCE ANALYSIS OF DISTRIBUTED APPLICATIONS USING AUTOMATIC CLASSIFICATION OF COMMUNICATION INEFFICIENCIES

(75) Inventor: Jeffrey S. Vetter, Pleasanton, CA (US)

(73) Assignee: The Regents of the University of California, Oakland, CA (US)

(*) Notice: Subject to any disclaimer, the term of this patent is extended or adjusted under 35 U.S.C. 154(b) by 664 days.

(21) Appl. No.: 09/922,355

(22) Filed: Aug. 3, 2001

(65) Prior Publication Data

US 2002/0165838 A1 Nov. 7, 2002

Related U.S. Application Data

(60) Provisional application No. 60/288,254, filed on May 1, 2001.

(51) Int. Cl.[7] .............................. G06F 17/00; G06E 1/00
(52) U.S. Cl. ........................................... 706/11; 706/20
(58) Field of Search ..................................... 706/11, 20

(56) References Cited

U.S. PATENT DOCUMENTS

| | | | | |
|---|---|---|---|---|
| 5,657,424 A | * | 8/1997 | Farrell et al. | 704/255 |
| 5,787,274 A | * | 7/1998 | Agrawal et al. | 707/102 |
| 5,870,735 A | | 2/1999 | Agrawal et al. | 707/3 |
| 6,182,058 B1 | | 1/2001 | Kohavi | 706/45 |
| 6,456,993 B1 | * | 9/2002 | Freund | 706/46 |

OTHER PUBLICATIONS

Safavian et al, "ASurvey of Decision Tree Classifier Methodology", IEEE Transaction on Systems, Man, and Cybernetics, May/Jun. 2001.*
S. M. Mahajan, "Anupro: Anupam Program Environment," Conference Article, Bangalore, India, Dec. 26–31, 1994, 6 pages.
A. N. Dunlop, et al., "Performance Estimating For Parallel Performance Optimisation," Supercomputer 1995 #62, 8 pages.
C. E. Wu, et al., "Timestamp Consistency and Trace–Driven Analysis for Distributed Parallel Systems," IEEE, 1995, 7 pages.
C. E. Wu, "Trace–Based Analysis and Tuning for Distributed Parallel Applications," IEEE, 1994, 8 pages.

* cited by examiner

*Primary Examiner*—George Davis
(74) *Attorney, Agent, or Firm*—Eddie E. Scott; Christopher J. Horgan; Alan H. Thompson

(57) ABSTRACT

The method and system described herein presents a technique for performance analysis that helps users understand the communication behavior of their message passing applications. The method and system described herein may automatically classifies individual communication operations and reveal the cause of communication inefficiencies in the application. This classification allows the developer to quickly focus on the culprits of truly inefficient behavior, rather than manually foraging through massive amounts of performance data. Specifically, the method and system described herein trace the message operations of Message Passing Interface (MPI) applications and then classify each individual communication event using a supervised learning technique: decision tree classification. The decision tree may be trained using microbenchmarks that demonstrate both efficient and inefficient communication. Since the method and system described herein adapt to the target system's configuration through these microbenchmarks, they simultaneously automate the performance analysis process and improve classification accuracy. The method and system described herein may improve the accuracy of performance analysis and dramatically reduce the amount of data that users must encounter.

20 Claims, 10 Drawing Sheets

```
int MPI_Send(void* buf, int count, MPI_Datatype datatype, int dest, int tag, MPI_Comm comm)
int MPI_Recv(void* buf, int count, MPI_Datatype datatype, int source, int tag, MPI_Comm comm, MPI_Status
*status)

int MPI_Isend(void* buf, int count, MPI_Datatype datatype, int dest, int tag, MPI_Comm comm, MPI_Request
*request)
int MPI_Irecv(void* buf, int count, MPI_Datatype datatype, int source, int tag, MPI_Comm comm,
MPI_Request *request)
int MPI_Wait(MPI_Request *request, MPI_Status *status)
```

FIG. 1

| Wrapper | Event Record |
|---|---|
| ```
extern int MPI_Send( void *buf , int count , MPI_Datatype datatype ,
                     int dest , int tag , MPI_Comm comm )
{
   int res = 0;
   INT64 duration=0;
   u_TIMESTRUCT start,end;
   u_GETTIME(&start);
   res = PMPI_Send( buf, count, datatype, dest, tag, comm );
   u_GETTIME(&end);
   duration = u_GETTIMEDIFF(&end,&start);

/* package event structure and write it to memory buffer */ return res;
}
``` | ```
<1082> MPI_Send {
         int64 timestamp[1];
         int32 rank[1];
         int64 duration[1];
         int32 count[1];
         int32 datatype[1];
         int32 dest[1];
         int32 tag[1];
         int32 comm[1];
       }
{1082 612339879 1 716 1250 20 0 2000 0}
{1082 612340004 3 636 1250 20 2 2000 0}
{1082 612341445 0 343 1250 20 1 3000 0}
{1082 612341472 2 339 1250 20 3 3000 0}
``` |

FIG. 5

| MPI Task 0 | MPI Task 1 |
|---|---|
| #define size 1024<br>int sdata[size];<br>int rdata[size];<br>MPI_Status status;<br>MPI_Request request;<br>int tag = 30;<br><br>/* initialization */<br>/* ---- blocking send-recv 0 -> 1 */<br>/* fill sdata */<br>MPI_Send (sdata, size, MPI_INT, 1,<br>   tag, MPI_COMM_WORLD);<br>/* use or overwrite sdata */<br><br>/* ---- non-blocking send recv 1->0 */<br><br>MPI_Irecv (rdata, size, MPI_INT, 1,<br>   tag, MPI_COMM_WORLD, &request);<br>/* computation excluding rdata */<br>MPI_Wait(&request,&status);<br>/* use rdata */<br><br>/* finish */ | #define size 1024<br>int sdata[size];<br>int rdata[size];<br>MPI_Status status;<br>MPI_Request request;<br>int tag = 30;<br><br>/* initialization */<br>/* ---- blocking send-recv 0 -> 1 */<br><br>MPI_Recv (rdata, size, MPI_INT, 0,<br>   tag, MPI_COMM_WORLD, &status)<br>/* use rdata */<br><br>/* ---- non-blocking send recv 1->0 */<br>/* fill sdata */<br>MPI_Isend (sdata, size, MPI_INT, 0,<br>   tag, MPI_COMM_WORLD, &request);<br>/* computation excluding sdata */<br>MPI_Wait(&request,&status);<br>/* use or overwrite sdata */<br><br>/* finish */ |

FIG. 2

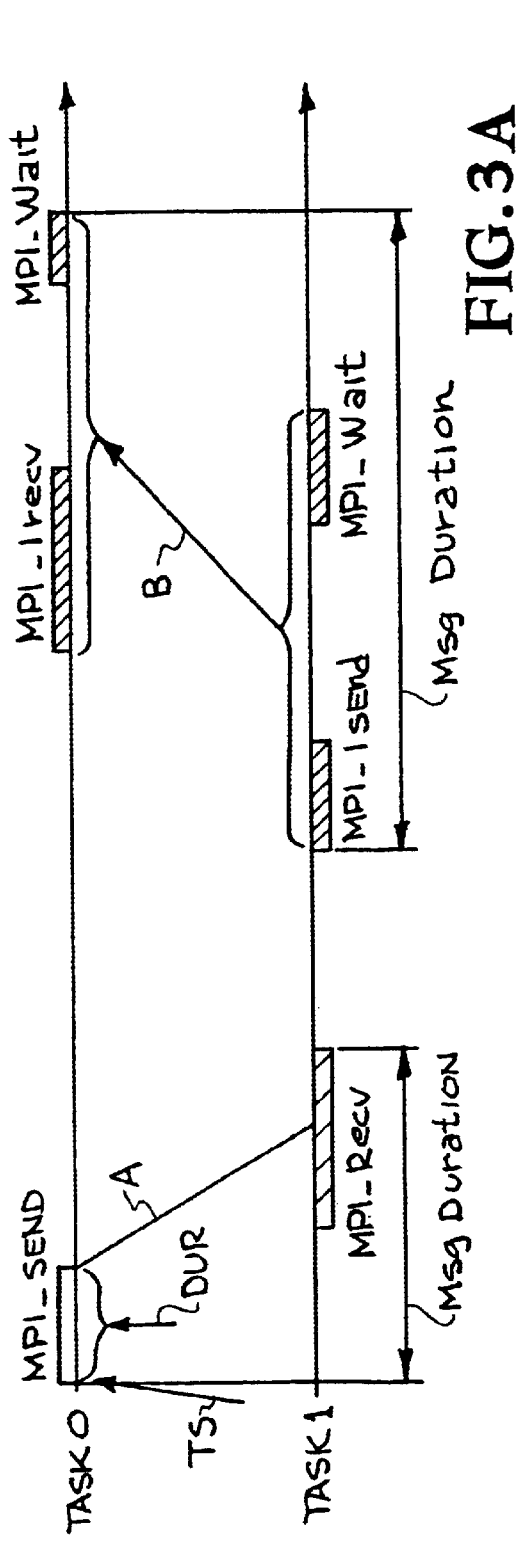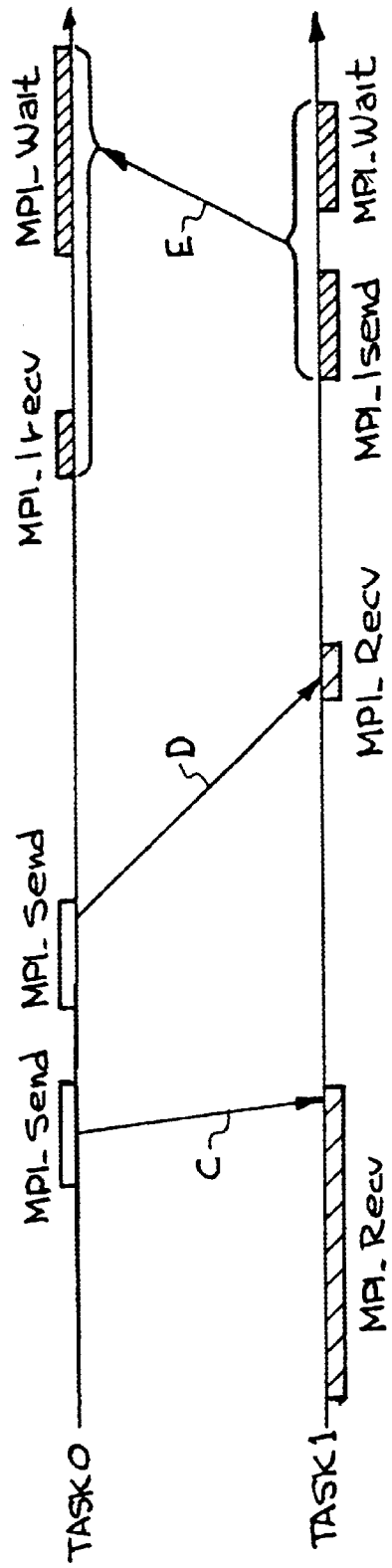
FIG. 3A
FIG. 3B

FIG. 8

| Send Type | Send Dur | Send Wait Dur | Recv Type | Recv Dur | Recv Wait Dur | Msg Size | Msg Dur | Class |
|---|---|---|---|---|---|---|---|---|
| send | 1.06 | 0.00 | recv | 0.98 | 0.00 | 16 | 0.97 | normal |
| send | 1.00 | 0.00 | recv | 0.92 | 0.00 | 16 | 0.93 | normal |
| isend | 1.77 | 1.22 | recv | 41.49 | 0.00 | 2 | 0.70 | late send post |
| isend | 1.26 | 1.14 | recv | 4.50 | 0.00 | 2 | 0.73 | late send post |
| isend | 0.65 | 1.84 | irecv | 1.12 | 0.82 | 32768 | 1.83 | late recv post |
| isend | 0.93 | 3.15 | irecv | 1.29 | 0.87 | 32768 | 3.05 | late recv post |

FIG. 9

| | | Prediction | | | | | | |
|---|---|---|---|---|---|---|---|---|
| | | normal | late send | late recv | late recv post | late recv wait | late send post | late send wait |
| Actual | normal | 786 | 4 | 3 | 3 | 2 | 14 | 28 |
| | latesend | 13 | 406 | 0 | 0 | 0 | 0 | 0 |
| | laterecv | 21 | 0 | 399 | 0 | 0 | 0 | 0 |
| | laterecvpost | 48 | 1 | 0 | 314 | 55 | 0 | 2 |
| | laterecvwait | 48 | 0 | 0 | 127 | 245 | 0 | 1 |
| | latesendpost | 20 | 0 | 1 | 0 | 0 | 397 | 3 |
| | latesendwait | 16 | 0 | 0 | 0 | 0 | 9 | 394 |

| Send Type | Send Dur | Send Wait | Recv Type | Recv Dur | Recv Wait | Msg Size | Msg Dur | Class | Confidence Factor |
|---|---|---|---|---|---|---|---|---|---|
| send | 2.90 | 0.00 | irecv | 2.70 | 1.86 | 1250 | 2.07 | late recv post | 0.92 |
| send | 3.35 | 0.00 | irecv | 1.21 | 1.60 | 1250 | 2.36 | late recv wait | 0.99 |
| send | 3.36 | 0.00 | irecv | 1.21 | 1.45 | 1250 | 2.34 | late recv wait | 0.99 |

FIG. 10

| Location | | Class | | | | | | |
|---|---|---|---|---|---|---|---|---|
| Sender | Receiver | Normal | Late Send | Late Recv | Late Send Post | Late Send Wait | Late Recv Post | Late Recv Wait |
| copy_faces+4268 | copy_faces+3980 | 2 | 0 | 0 | 34 | 0 | 0 | 1572 |
| x_solve+7716 | x_solve+888 | 0 | 0 | 0 | 1600 | 0 | 0 | 4 |

FIG. 11

| Application | Normal Runtime (seconds) | MPI_Send | MPI_Recv | MPI_Isend | MPI_Irecv |
|---|---|---|---|---|---|
| CG-HEAT | 70 | 6828 | 148 | 0 | 6680 |
| NAS BT | 1344 | 0 | 0 | 9672 | 9672 |
| NAS SP | 840 | 0 | 0 | 19272 | 19272 |
| SPPM | 287 | 0 | 0 | 480 | 480 |

FIG. 12

| Application | Sender Location | Receiver Location | Class | | | | | | |
|---|---|---|---|---|---|---|---|---|---|
| | | | normal | late send | late recv | late send post | late send wait | late recv post | late recv wait |
| NAS BT | copy_faces+4056 | copy_faces+3636 | 795 | 0 | 0 | 2 | 0 | 11 | 0 |
| | copy_faces+4000 | copy_faces+3696 | 0 | 0 | 0 | 755 | 0 | 0 | 53 |
| | copy_faces+4168 | copy_faces+3756 | 2 | 0 | 0 | 22 | 0 | 0 | 784 |
| | copy_faces+4112 | copy_faces+3816 | 3 | 0 | 0 | 6 | 0 | 0 | 799 |
| | copy_faces+4280 | copy_faces+3876 | 4 | 0 | 0 | 35 | 0 | 0 | 769 |
| | copy_faces+4224 | copy_faces+3936 | 3 | 0 | 0 | 27 | 0 | 0 | 778 |
| | x_send_solve_info+612 | x_receive_solve_info+124 | 804 | 0 | 0 | 0 | 0 | 0 | 0 |
| | x_send_backsub_info+432 | x_receive_backsub_info+120 | 0 | 0 | 0 | 28 | 162 | 0 | 614 |
| | y_send_solve_info+608 | y_receive_solve_info+124 | 804 | 0 | 0 | 0 | 0 | 0 | 0 |
| | y_send_backsub_info+420 | y_receive_backsub_info+120 | 0 | 0 | 0 | 35 | 208 | 0 | 561 |
| | z_send_solve_info+908 | z_receive_solve_info+124 | 804 | 0 | 0 | 0 | 0 | 0 | 0 |
| | z_send_backsub_info+348 | z_receive_backsub_info+120 | 0 | 0 | 0 | 21 | 183 | 0 | 600 |
| 9672 | | | 3219 | 0 | 0 | 931 | 553 | 11 | 4958 |
| NAS SP | copy_faces+4100 | copy_faces+3680 | 1575 | 0 | 0 | 6 | 0 | 27 | 0 |
| | copy_faces+4044 | copy_faces+3740 | 0 | 0 | 0 | 1474 | 0 | 1 | 133 |
| | copy_faces+4212 | copy_faces+3800 | 6 | 0 | 0 | 22 | 0 | 0 | 1580 |
| | copy_faces+4156 | copy_faces+3860 | 3 | 0 | 0 | 17 | 0 | 0 | 1588 |
| | copy_faces+4324 | copy_faces+3920 | 0 | 0 | 0 | 33 | 0 | 0 | 1575 |
| | copy_faces+4268 | copy_faces+3980 | 2 | 0 | 0 | 34 | 0 | 0 | 1572 |
| | x_solve+7716 | x_solve+888 | 0 | 0 | 0 | 1600 | 0 | 0 | 4 |
| | x_solve+17864 | x_solve+8272 | 0 | 0 | 0 | 1604 | 0 | 0 | 0 |
| | y_solve+7632 | y_solve+872 | 0 | 0 | 0 | 1602 | 0 | 0 | 2 |
| | y_solve+17236 | y_solve+8180 | 0 | 0 | 0 | 1604 | 0 | 0 | 0 |
| | z_solve+7612 | z_solve+912 | 0 | 0 | 0 | 1603 | 0 | 0 | 1 |
| | z_solve+17224 | z_solve+8184 | 0 | 0 | 0 | 1604 | 0 | 0 | 0 |
| 19272 | | | 1586 | 0 | 0 | 11203 | 0 | 28 | 6455 |
| CG HEAT | snd_int+80 | rcv_int+128 | 141 | 3 | 4 | 0 | 0 | 0 | 0 |
| | snd_r8+80 | rcv_asynch_r8+136 | 1396 | 2321 | 0 | 4 | 0 | 819 | 2140 |
| 6828 | | | 1537 | 2324 | 4 | 4 | 0 | 819 | 2140 |
| SPPM | xbdrys+1248 | xbdrys+152 | 40 | 0 | 0 | 0 | 0 | 0 | 0 |
| | xbdrys+1184 | xbdrys+212 | 40 | 0 | 0 | 0 | 0 | 0 | 0 |
| | xbdrys+6028 | xbdrys+288 | 29 | 0 | 0 | 0 | 10 | 0 | 1 |
| | xbdrys+5960 | xbdrys+356 | 6 | 0 | 0 | 12 | 12 | 0 | 10 |
| | ybdrys+1248 | ybdrys+152 | 40 | 0 | 0 | 0 | 0 | 0 | 0 |
| | ybdrys+1184 | ybdrys+212 | 40 | 0 | 0 | 0 | 0 | 0 | 0 |
| | ybdrys+6588 | ybdrys+288 | 31 | 0 | 0 | 0 | 9 | 0 | 0 |
| | ybdrys+6520 | ybdrys+356 | 8 | 0 | 0 | 10 | 9 | 0 | 13 |
| | zbdrys+6268 | zbdrys+288 | 19 | 0 | 0 | 0 | 19 | 0 | 2 |
| | zbdrys+6200 | zbdrys+356 | 14 | 0 | 0 | 16 | 5 | 0 | 5 |
| | zbdrys+10920 | zbdrys+432 | 33 | 0 | 0 | 0 | 7 | 0 | 0 |
| | zbdrys+10852 | zbdrys+500 | 12 | 0 | 0 | 17 | 4 | 0 | 7 |
| 480 | | | 312 | 0 | 0 | 55 | 75 | 0 | 38 |

FIG. 13

PERFORMANCE ANALYSIS OF DISTRIBUTED APPLICATIONS USING AUTOMATIC CLASSIFICATION OF COMMUNICATION INEFFICIENCIES

This application claims the benefit of provisional application No. 60/288,254, filed May 1, 2001.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to performance analysis and more specifically to optimizing performance analysis using machine learning.

BACKGROUND OF THE INVENTION

Message passing serves as an effective programming technique for exploiting coarse-grained concurrency on distributed computers as evidenced by the popularity of Message Passing Interface (MPI). Nowadays, most applications for tera-scale computing environments, such as the systems at the National Science Foundation Alliance Centers, the Department of Energy Accelerated Strategic Computing Initiative (ASCI) Labs, and the computational grid, rely on MPI for inter-nodal communication. Often, users even use MPI for intra-nodal communication because many versions of MPI provide highly optimized communication primitives that use shared memory rather than networking protocols for message transfers.

The performance of these distributed applications may be challenging to comprehend because a distributed application's performance stems from three factors: application design, software environment, and underlying hardware. This comprehension is even more complex when considering computer systems with hundreds, if not thousands, of processors. One strategy for performance optimization of these applications is to eliminate the distributed application's communication inefficiencies. The communication inefficiencies arise under many scenarios: one common scenario is where processors are stalled for long periods waiting to receive a message or when the application loses the opportunity to perform computation simultaneously with communication. Traditionally, programmers infer explanations for these types of inefficiencies manually, basing their conclusions on knowledge of the source code, message tracing, visualizations, and other customized performance measurements. This manual analysis may be time-consuming, error-prone, and complicated, especially if the developer must analyze a large number of messages, or if the messages are non-deterministic.

Only recently have researchers addressed the higher level goal of automating the task of performance analysis per se. Many performance analysis tools provide some level of support to help users locate performance problems. For example, as discussed in a publication by Meira, Jr., W., LeBlanc, T. J., and Poulos, A. entitled "Waiting Time Analysis and Performance Visualization in Carnival," Proc. ACM SIGMETRICS Symposium on Parallel and Distributed Tools," 1996, pp. 1–10, Carnival attempts to automate the cause-and-effect inference process for performance phenomena. Carnival supports waiting time analysis, an automatic inference procedure that explains each source of waiting time in terms of the underlying causes, instead of only its location. In a publication by Rajamony, R. and Cox, A. L. entitled "Performance Debugging Shared Memory Parallel Programs Using Run-Time Dependence Analysis," Performance Evaluation Review (Proc. 1997 ACM International Conference of Measurement and Modeling of Computer Systems, SIGMETRICS 97), 25(1):75–87, 1997, there is a discussion of building a performance debugger that automatically identifies code transformations that reduce synchronization and communication. The performance debugger suggests predefined code transformations to the user in terms of application source code. In a publication by Miller, B. P., Callaghan, M. D., Cargille, J. M., Hollingsworth, J. K., Irvin, R. B., Karavanic, K. L., Kunchithapadam, K., and Newhall, T., "The Paradyn Parallel Performance Measurement Tool," IEEE Computer, 28(11): pp. 37–46, 1995, there is discussed a performance tool that provides an automated performance consultant that uses the W3 search model to test and verify hypothesis about a target application. The W3 Search Model abstracts those characteristics of a parallel program that can affect performance and using Paradyn's dynamic instrumentation, it tries to answer three questions about these performance hypothesis: why is the application performing poorly, where is the performance problem, and when does the problem occur? Tmon, as discussed by Ji, M., Felten, E. W. and Li, K, "Performance Measurements for Multithreaded Programs," Proc. SIGMETRICS 98, 1998, pp. 161–170 is a performance tool for monitoring and tuning multithreaded programs. Tmon measures thread waiting time and constructs graphs to show thread dependencies and bottlenecks. It also identifies "semi-busy-waiting" points, where CPU cycles are wasted on condition checking and context switching. Quartz as discussed in Anderson, T. E., and Lazowska, E. D., entitled "Quartz: A Tool For Tuning Parallel Program Performance," Proc. 1990 SIGMETRICS Conf. Measurement and Modeling Computer Systems, 1990, pp. 115–125, extends the ideas of UNIX gprof to shared memory multiprocessors and provides a new metric named "normalized processor time." This metric directs programmer's attention to those sections of source code that are responsible for poor parallel performance by revealing poor concurrency based on the number of idle processors.

Cray Computer™ provides two tools that help locate performance problems with applications: ATExpert™ and MPP Apprentice™. ATExpert™ analyzes application source code and predicts autotasking performance on a dedicated Cray PVP system. MPP Apprentice™ helps developers locate performance bottlenecks on the Cray T3E. MPP Apprentice™ reports, for example, time statistics summed across all compute nodes for the whole program, as well as each loop, conditional, or other statement block. It provides the total execution time, the synchronization and communication time, the time to execute a subroutine, and the number of instructions executed. It also can offer advice on how to get rid of the performance bottlenecks. Because both MPP Apprentice™ and ATExpert™ are commercial tools, it is not possible to evaluate their underlying techniques for automation.

A variety of researchers have applied statistical techniques to performance data in an effort to reduce data volume or to automate tasks for the user. These techniques include covariance analysis, discriminant analysis, principle component analysis, and clustering. For instance, clustering, as described in Johnson, R. A., "Applied Multivariate Statistical Analysis," Englewood Cliffs, N.J., USA: Prentice-Hall, 1982, is a well-known data analysis technique that categorizes a raw dataset in the hopes of simplifying the analysis task. The primary goal of clustering is to segregate data points into clusters where points that belong to the same cluster are more similar than to points in unlike clusters. As discussed in Reed, D. A., Aydt, R. A., and Noe, R. J., Shields, K. A., and Schwartz, B. W., "An Overview of the Pablo Performance Analysis Environment," Department of Computer Science, University of Illinois, 1304 West Springfield Avenue, Urbana, Ill. 61801, 1992, and Reed, D. A., Nickolayev, O. Y., and Roth, P. C., "Real-Time Statistical Clustering and For Event Trace Reduction," J. Supercomputer Applications and High-Performance Computing, 11(2): 144–59, 1997, one instance of using clustering for performance analysis identifies clusters of processors with similar performance metrics and then, it selects only one processor from each cluster to gather detailed performance information. As a result, clustering can reduce data volume and instrumentation perturbation. One downfall of using statistical techniques for analyzing performance data is the difficulty of mapping the results of an analysis back to the source code. More importantly, statistical techniques, on occasion, can provide correct, but enigmatic results that can be difficult for programmers to use in improving their application's performance. In the knowledge discovery field, Lee and colleagues as discussed in Lee, W., Stolfo, S. J., and Mok, K. W., "Mining In A Data-Flow Environment: Experience In Network Intrusion Detection," Proc. Fifth ACM SIGKDD International Conference Knowledge Discovery and Data Mining, 1999, pp. 114–124, have focused machine learning techniques on traces of Internet network activity to provide an automated support for intrusion detection in computer networks. Their system learns normal network activity by modeling user's habits and locations as well as other activity, such as nightly backups. Then, their system takes appropriate actions when activity appears suspicious. To assist with the analysis of large trace files, numerous researchers have investigated visualization techniques including Heath, M. T., Malony, A. D., and Rover, D. T., "The Visual Display of Parallel Performance Data," Computer 28(11): 21–28, Stasko, J., Domingue, J., et al., "Software Visualization: Programming as a Multimedia Experience," MIT Press: Cambridge, Mass., 1998, Bailey, D., Barszcz, E., Barton, J., Browning, D, Carter, R., Dagum, L., Fatoohi, R., Fineberg, S., Frederickson, P., Lasinski, T., Schreiber, R., Simon, H., Venkatakrishnan, V., and Weeratunga, S., "The NAS Parallel Benchmarks (94)," NASA Ames Research Center, RNR Technical Report RNR-94-007, 1994, a host of commercial tools also provide advanced visualization capabilities for understanding the communications behavior. These tools include Vampir, IBM's VT, ANL's Upshot and Jumpshot, and ORNL's Paragraph.

SUMMARY OF THE INVENTION

Aspects of the present invention include a method and system of performance analysis using machine learning comprising: generating a plurality of training records to model the behavior of a first application; creating a decision tree classifier having a plurality of tests based on the plurality of training records; and applying said decision tree classifier to a second application.

Further aspects of the present invention include a method and system for performance analysis using machine learning comprising: a microprocessor and memory configured to generated a plurality of training records to model the behavior of a first application; the microprocessor and memory configured to create a decision tree classifier having a plurality of tests based on the plurality of training records; and the microprocessor and memory configured to apply said decision tree classifier to a second application.

BRIEF DESCRIPTION OF THE DRAWINGS

The accompanying drawings, which are incorporated into and form a part of the disclosure, FIG. 1 illustrates an example of MPI C prototypes for both blocking and non-blocking sends and receives;

FIG. 2 illustrates an example of message operations using a MPI;

FIGS. 3A and 3B illustrate space-time diagrams of send-receive operations;

FIG. 5 illustrates a tracing wrapper (or alternate definition) and event record for MPI_Send;

FIG. 8 illustrates examples of user classified training records (input feature vectors) for a modeling phase;

FIG. 9 illustrates a confusion matrix;

FIG. 10 presents several output classifications for an example application CG-Heat;

FIG. 11 is an example of a caller dependent classification summary for NAS SP; and FIG. 12 is a profile of example applications; and FIG. 13 illustrates results of classifications on example applications.

DETAILED DESCRIPTION OF THE INVENTION

Figure 4:
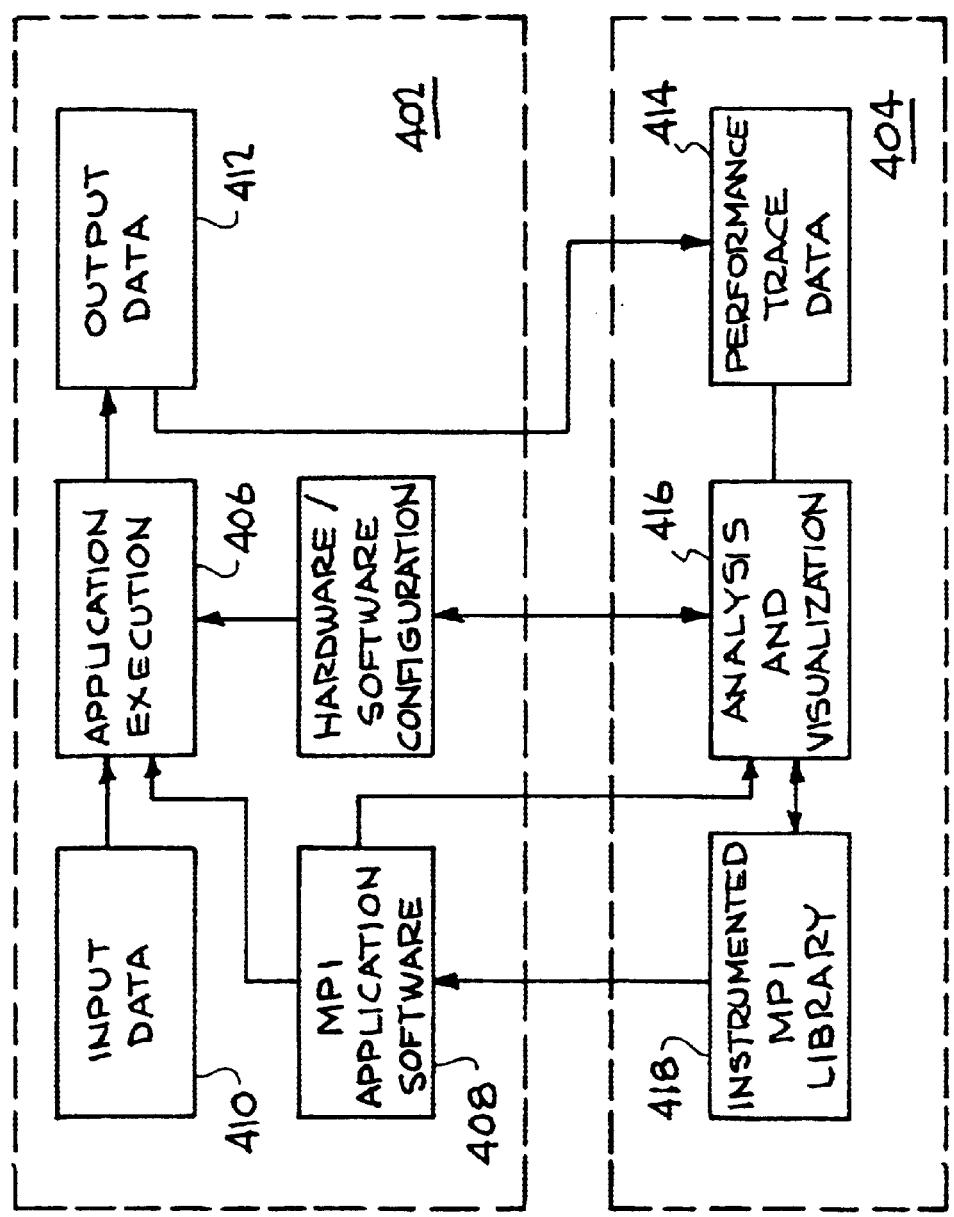
FIG. 4 illustrates a flow diagram of MPI application performance tracing.

The method and system disclosed herein involves performance analysis using machine learning (also known as artificial intelligence). The method and system disclosed herein will be discussed in the context of MPI because MPI serves as an important foundation for a large group of applications and because the elimination of communications inefficiencies from MPI applications is a well-known technique for improving application performance. However, it is to be understood that the method and system described herein is not limited to MPI applications.

MPI provides a wide variety of communication operations including both blocking and non-blocking sends and receives, collective operations, such as broadcast and global reductions, and a host of other communication features. The focus of attention is on a common subset of operations because they are easy to reason about and widely used: blocking send, blocking receive, non-blocking send, and non-blocking receive. These operations are discussed in Snir, M., Otto, S., et al., Eds., "MPI—The Complete Reference: Scientific and Engineering Computation," MIT Press: Cambridge, Mass., 1998, hereby incorporated herein by reference. MPI provides a rather comprehensive set of messaging operations and every combination is not discussed herein. Many of these operations are orthogonal because the use of a certain type of send operation does not imply the use of a certain type of receive operation and visa versa. For instance, during a single message transfer, the sender may use a blocking send while the receiver uses a non-blocking receive. FIG. 1 is an example of MPI C prototypes for both blocking and non-blocking sends and receives.

MPI Blocking Send-Receive

MPI's primitive communication operation is the blocking send to blocking receive. The first message operation in FIG. 2 illustrates one message transfer from task 0 to task 1 using a blocking send and blocking receive, respectively. A blocking send (MPI_Send) does not return until both the message data and envelope have been safely stored away. When the blocking send returns, the sender is free to access and overwrite the send buffer. Note that these semantics allow the blocking send to complete even if no matching receive has been executed by the receiver. MPI does offer the user a choice of several communication modes so that a user may control the costs of buffering as well as the option of the communication protocol. Task 0, in FIG. 2, uses MPI_Send to transfer the contents of sdata (send data) to task 1. Once MPI_Send returns, task 0 is free to use or overwrite the data in sdata.

A blocking receive (MPI_Recv) returns when a message that matches its specification has been copied to a buffer. The receive operation specifies three parameters that identify which message it wishes to match: a source identifier, a message tag, and a communicator. In FIG. 2, task 1 continues only when MPI_Recv returns, which assures task 1 that rdata (return data) is ready to use. Both task 0 and task 1 must use the same communicator and message tag for this message transfer.

MPI Non-Blocking Send-Receive

As an alternative to blocking communication operations, MPI also provides non-blocking communication to allow an application to overlap communication and computation. Usually, this overlap improves application performance albeit at the cost of some software complexity. In non-blocking communication, initiation and completion of communication operations are distinct. The second message operation in FIG. 2 illustrates one message transfer from task 1 to task 0 using a non-blocking send and non-blocking receiver, respectively.

A non-blocking send has both a send start call and a send complete call. The send start call (MPI_Isend) initiates the send operation and it may return before the message is copied out of the send buffer. The send complete call (MPI_Wait) completes the non-blocking send by verifying that the data has been copied out of the send buffer. It is this separation of send start and send complete that provides the application with the opportunity to perform computation. Task 1, in FIG. 2, uses MPI_Isend to initiate the transfer of sdata to task 0. During the time between MPI_Isend and MPI_Wait, task 1 may not modify sdata because the actual copy of the message data from sdata is not guaranteed until the MPI_Wait call returns. After MPI_Wait returns, task 1 is free to use or overwrite the data in sdata.

Similarly, a non-blocking receive has both a receive start call and a receive complete call. The receive start call (MPI_Irecv) initiates the receive operation and it may return before the incoming message is copied into the receive buffer. The receive complete call (MPI_Wait) completes the non-blocking receive by verifying that the data has been copied into the receive buffer. As with non-blocking send, the application has the opportunity to perform computation between the receive start and receive complete calls. Task 0, in FIG. 2, uses MPI_Irecv to initiate the receive of sdata from task 1. During the time between MPI_Irecv and MPI_Wait, task 0 may not read or modify rdata because the message from task 1 is not guaranteed to be in this buffer until the MPI_Wait call returns. After MPI_Wait returns, task 0 is free to read rdata.

Communication Efficiency

Both synchronization and communication are significant sources of overhead in MPI applications. From the performance perspective, several timing examples may help reveal the efficiency of MPI communication and its overhead. FIG. 3A shows the normal flow of messages (A,B) for the code segment illustrated by FIG. 2. Each MPI operation has a start time and duration (Msg Duration). The duration of a complete message transfer may be defined to be the difference between the end of the receive and the beginning of the send. Although this definition does not capture the actual departure and arrival of messages in hardware, it does capture sufficient information from the viewpoint of the application to make decisions about communication efficiency. FIG. 3B shows several types of communication inefficiencies, C, D and E.

Tracing MPI Applications

To capture the communication operations and respective timing of MPI applications, the execution may be traced. Application development 402 and performance analysis 404 processes are illustrated in FIG. 4. An application execution 406 uses MPI application software 408 and input data 410 to produce output data 412. Performance trace data 414 is captured about some application component in the form of discrete events over a period of time. Users may analyze these events (reference numeral 416) at runtime or they may write these events to a log file for post-mortem analysis. Most trace-based performance analysis systems use this approach. Tracing is chosen because it provides a chronological description of application events and consequently, it is more general than techniques such as profiling. This detailed description of message activity is necessary because there must be the ability to reconcile specific message sends with their receives. An instrumented library (or an otherwise instrumented application) 418 is used to capture MPI information to the trace file. This instrumentation is interposed between the MPI application and the MPI runtime library. MPI's profiling layer is a portable mechanism, usually implemented with a set of name-shifted functions, that allows a user to write an alternate definition for MPI functions that capture additional information and then call the underlying MPI runtime library (implementation).

The method and system described herein takes advantage of MPI's profiling layer by capturing information about each MPI call into an event structure, periodically flushing the event buffer to local disk. An MPI call may be defined as an entry point for an MPI library subroutine that is invoked from user code. FIG. 5 illustrates both the alternate definition for the MPI_Send library subroutine and examples of its respective event records that are written to the trace file at runtime.

These benefits of tracing in mind, several shortcomings limit tracing's usefulness. First, software instrumentation is necessary in either the application itself or a library that the application calls. Software instrumentation is software added to the target application to capture characteristics about the application itself. Second, the perturbation introduced by tracing may change the results of the analysis. And third, tracing generates a tremendous amount of data. Hence, users must extract useful information from these large traces. This challenge has prompted significant research efforts, especially in the area of visualization. In regard to these shortcomings, tracing is especially useful for capturing message passing and input/output (I/O) activity because they are generally high latency operations and the amortized costs for tracing are relatively small when compared to communication and I/O operations. Further, the MPI are relatively infrequent. During evaluations, the overall application runtime with tracing enabled should not increase the runtime significantly over the normal runtime, and, typically, never observe a change in the runtime of greater than approximately 1%.

Decision Tree Classification

Decision tree classification (DTC), as defined in machine learning literature, is a classification technique that discovers and analyzes patterns in input feature vectors. Feature vectors may be a list of important attributes and their values that describe the system being modeled. This type of classification maps the input feature vector into one of several predefined classes by applying a series of tests to the feature vector. Specifically, a decision tree is a tree with internal nodes representing tests and leaf nodes signifying classes. Classification begins with the test at the root of the tree, and continues along branches of the tree until a leaf (or class) is encountered. Each test has mutually exclusive and exhaustive outcome. As a supervised learning technique, decision trees generate their series of tests inductively from a set of representative examples provided by the user.

Decision trees may be focused on for at least three reasons. One, models developed by decision trees are intelligible to human users. Unlike other techniques, such as neural networks and genetic algorithms, decision trees allow the user to verify how the classification arrived at its answer by simply looking at the set of tests as applied to an input feature vector. Second, decision trees are relatively efficient in both the modeling and classification when compared to other supervised learning techniques. Finally, other techniques such as neural networks may in fact lower the error rate of the classification procedure; however, the possible inaccuracy of decision trees may be exchanged for their superior understandability.

Figure 6:
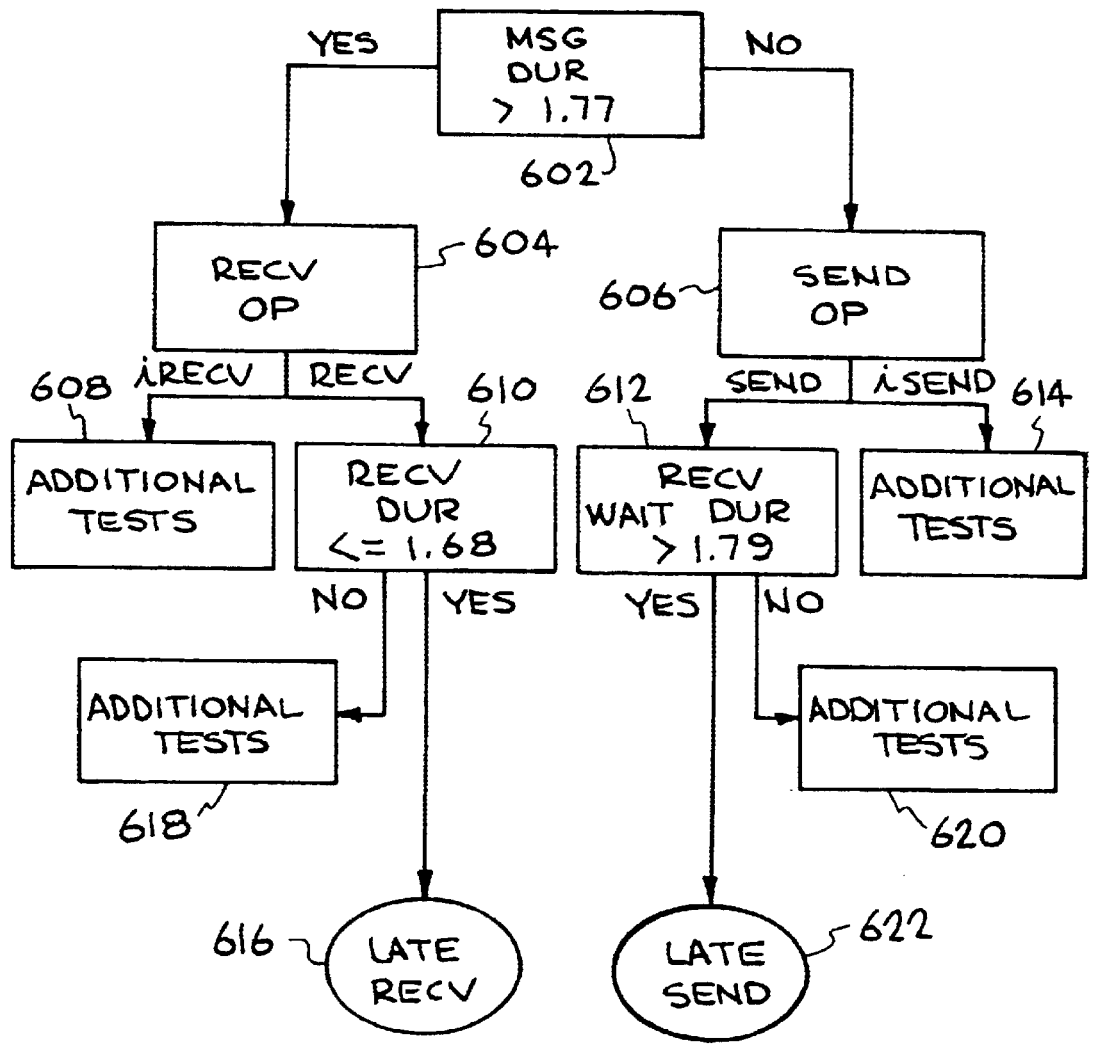
FIG. 6 illustrates a flowchart of a decision tree.

FIG. 6 illustrates two branches of a decision tree for classifying an MPI message transfer. Note that neither does the number of tests (or the tree's depth) need be the same nor does the test at each level have to be the same. As shown in FIG. 6, the decision tree classifier has a series of tests that is applies to the sample under consideration. In this context, the input feature vectors contains several attributes of a MPI message transfer including Msg Duration, type of send operation, type of recv operation, recv duration, recv wait duration, etc. The feature vector is then easily applied to the decision tree in FIG. 6, one test at a time, beginning with the root. For example, assume that the feature vector has the following set of values (message duration=2, recv op=recv, recv dur=1), then the decision tree would apply the following tests in the order: test 602, result yes (therefore, not a send operation 606 and there is no need to determine if it is a late send 622 by applying tests 612, 614 and 620); test 604, result, recv (and there is no need to pursue additional tests 608); test 610, result is less than 1.68 (and no need to pursue additional tests 618); classification for this input feature vector (or this MPI message transfer) is Late Recv as identified by the leaf node 616.

As discussed above, the use of decision trees has two distinct phases: the modeling phase and the classification phase. In the modeling phase, the user provides the decision tree with representative examples of feature vectors along with the user specified classification. The decision tree constructs its set of tests from these samples. In the classification phase, the user provides the decision tree with unclassified feature vectors and the trained decision tree classifies each vector.

Implementation of Method and System Described Herein

Overview

Figure 7:
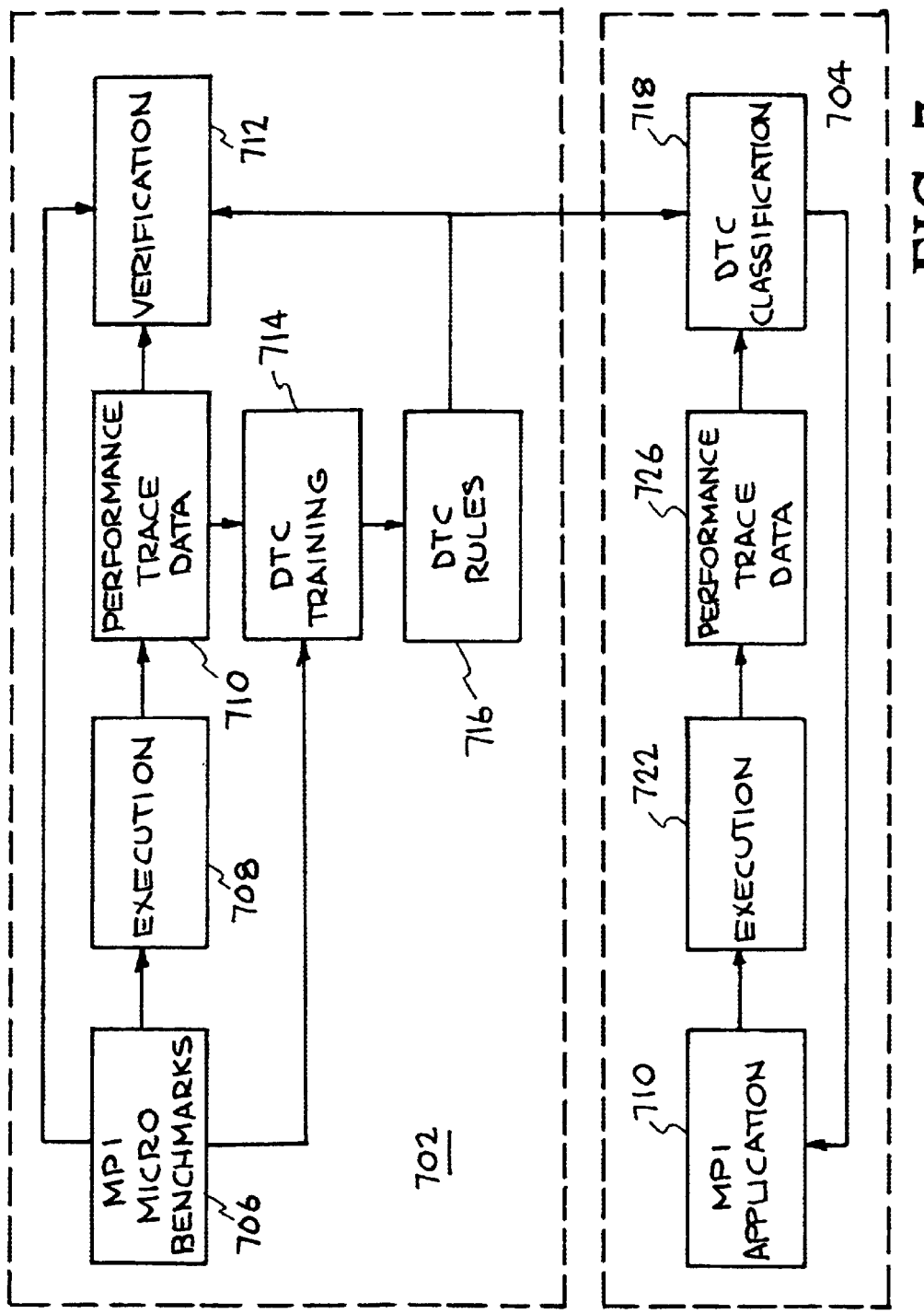
FIG. 7 illustrates an integration of decision tree classification with performance analysis.

The method and system disclosed herein may use the customization of performance rules for each programming environment. (To this end, an alternative approach would be to analytically model the principle components of the underlying hardware and software of the target system. The classification system could then use this model to determine how to classify the communication behavior of an application). The method and system described herein use an MPI tracing tool (Applicants do not claim a novel approach to tracing MPI applications) that captures a trace file for each MPI task and a post-mortem analysis filter that merges and classifies the MPI message activity of the application. As illustrated in FIG. 7, the process divides into two parts: the modeling phase 702 and the classification phase 704. In the embodiment discussed below, the decision trees may be implemented in C4.5 as discussed by J. R. Quinlan in *C4.5:Programs for Machine Learning*, San Mateo, Calif., Morgan Kaufmann Publishers, 1993, which is hereby incorporated by reference.

The method and system described herein may be implemented on a system having at least one microprocessor and one Megabyte (MB) of memory, however, a typical system may have at least 2 Gigabytes (GB) of memory and 4 microprocessors.

Modeling Phase

In the modeling phase, the decision tree may be trained by providing it with examples of efficient and inefficient MPI behavior from a first application. It is during this phase that the decision tree generates a plurality or series of rules (or tests) that it will later apply to unclassified performance data (or a second application).

As FIG. 7 depicts, the modeling phase begins with the execution of MPI microbenchmarks 706 on the target platform using the same software and hardware configuration as the user's environment. Software benchmarks provide a standardized problem or test that serves as basis for evaluation or comparison of a software characteristic. Microbenchmarks are typically smaller software benchmarks used to understand a compartmentalized attribute of computer system performance. A plurality of benchmarks (or microbenchmarks) may be used to train the decision tree; they may be normal MPI programs with one simple procedure call delineating the different phases of performance behaviors. The benchmarks reproduce efficient and inefficient behavior for MPI messages. More importantly, they reproduce performance problems with these programming practices. Classes for message transfers may include normal, late send, late recv, late send post, late send wait, late recv post, and late recv wait.

During microbenchmark execution 708, the tracing system 710 captures an event for each MPI call and writes it to a trace file in DTC training step 714. Each microbenchmark labels each phase of their execution with a stamp describing the behavior that they are emulating. Later, a filter merges multiple trace files and reconciles sends with receives. The result of this reconciliation is a plurality of training records in an efficient format containing fundamental information about each message transfer as FIG. 8 illustrates. In FIG. 8, all times are normalized to the average of those times measured for the normal class. Each of the plurality of training records contains two attributes identifying the type of send operation and receive operation, and five durations relating to the transfer: send duration, send wait duration, receive duration, receive wait duration, and message duration. All durations except the message duration are the length of the time required to complete the respective MPI call. Message duration is the time from send initiation until the message is available to the receiving task. In the case of the blocking receive, the message is available to the receiving task when the receive ends. In the case of nonblocking receive, the message is ready when the receive's wait completes.

With these training records (or examples) in hand, the DTC rule generator 716 may be used to create the decision tree. The output of this process is a decision tree and a set of production rules as discussed above. The algorithm for decision tree generation is detailed in Quinlan in *C4.5:Programs for Machine Learning*. The decision tree and rules for the classification process are saved. In operation, the decision tree and rules for the classification process usually apply to only one software and hardware configuration. When the configuration for the application changes, the user must regenerate the decision tree.

To verify the tests generated by the decision tree in step 712, the decision tree may be applied to the original training data used to develop the decision tree. For this training set, FIG. 9 shows a confusion matrix. This confusion matrix provides an example of how the actual classifications compare to the predictions made by the decision tree. The confusion matrix may be used to demonstrate that DTC may not provide perfect classification; however, several techniques, such as boosting, may improve this error rate. Other data cleaning techniques may be used which may improve the predictive power of DTC for performance analysis data. Additionally, the user may manually apply the decision tree to any anomalous cases to determine the source of the misclassification.

Classification Phase

In the classification phase 704, trace data may be fed from MPI applications 720 during execution 722 through performance trace data 726 into the decision tree classifier 718 which may classify all of the application's message activity based on the decision tree generated during the modeling phase. As with the modeling phase, the classifier merges the trace files, reconciles message sends with receives, and normalizes the durations. At this point, the classifier reads the unclassified records and applies the decision tree rules to each message transfer. FIG. 10 presents several output classifications for an example application entitled "CG-Heat." The last two columns "Class" and "Confidence Factor" show the classification and the confidence factor that the DTC filter selected for the message transfers.

Mapping Classifications to Source Code

The initial classification of all the message transfers may be useful, but these classifications need to be mapped back to the original source code in the application. Many tracing tools provide only details on message sends and receives without regard to their location in the source code. This limitation forces users into an arduous procedure of first, gathering more information about the send-receive pair, such as tag and communicator information, and then, searching for those locations in the source code.

To enhance this situation, the tracing tool described herein captures the address of the caller routine and a relative offset from the beginning of the caller routine to the called MPI function. With this additional information, discrimination may be made among the MPI calls and summarize the decision tree classifications based on the location of the sender and the receiver in the source code. In most cases, this summarization reduces all messages transfers to a plurality of MPI calls that the user may immediately investigate. Given the predominant class of the communication operations, the user knows the performance rating of each particular MPI call. FIG. 11 presents an example of the caller dependent classification summary for example application entitled "NAS SP." NAS SP is a benchmark described in Bailey, D. H., Barszcz, E., et al., "NAS Parallel Benchmark Results," IEEE Parallel & Distributed Technology: Systems & Applications 1(1): 43–51, 1993, hereby incorporated by reference. Columns 1 and 2 provide the names of the subroutines calling MPI functions. The next seven columns furnish the classifications for the messages transferred between the sender and receiver. For instance, row 2 of FIG. 11 reveals the method and system disclosed herein over 9.8% of the messages transferred from x_solve+7716 to x_solve+888 as last send posts. With this evidence in hand, a performance analyst may investigate the software hoping to move forward this send's initiation in the control flow of x_solve.

Evaluation

The evaluation focuses on data reduction, portability and accuracy. Data reduction may be measured by extracting only the abnormal message operations from the trace. Portability may be assessed by training the decision tree on at least two different software configurations and then applying the classifier to the application traces. Accuracy may be gauged by investigating the underlying causes of the abnormal message behavior in the application. If the classification system misidentified the message behavior, an explanation may be provided when possible. (This is substantially the same procedure that a user would follow if they were interrogating their application's performance). The choice of decision trees as the classification mechanism simplifies this subjective evaluation.

Hardware and Software Configurations

To evaluate the classification system, an IBM SP2™ was used having each node with 2 Gigabytes (GB) of main memory and 4 processors. The IBM's native MPI implementation was used. Tests were performed with at least two different software configurations for the MPI communication subsystem: IP mode and US mode. IP mode uses standard internet protocol for messages while US mode exploits the SP2's high performance switch. US mode was found to perform better than IP Mode for all message sizes up to the maximum size for the tests described herein (i.e., 4 MegaBytes (MB)). Like most platforms, the IBM has dozens, if not hundreds, of configuration parameters that directly impact performance. These differences underscore the need for a performance analysis framework as described herein that adapts to the target platform configuration to improve accuracy. This simple configuration change in software invalidates techniques that rely on fixed thresholds for analyzing performance.

Applications

Two benchmarks and two scientific applications were selected for an experiment. These applications were run on the SP2 and collected trace files of their message passing activity. FIG. 12 lists the applications entitled CG-HEAT, NAS BT, NAS SP and Simplified Piecewise Parabolic Method (SPPM) and their basic characteristics: optimized, 4 processor runtime and number of send and receive operations. Since these codes are reasonably mature, they are expected to be highly optimized.

Benchmark applications NAS SP and BT represent computational fluid dynamics (CFD) applications that solve systems of equations resulting from an approximately factored implicit finite-difference discretization of Navier-Stokes equations. The NAS SP and NAS BT algorithms have a similar structure: each solves three sets of uncoupled systems of equations. NAS BT solves block-tridiagonal systems of 5×5 blocks; NAS SP solves scalar pentadiagonal systems resulting from full diagonalization of the approximately factored scheme.

NAS BT, as FIG. 13 shows, has seven subroutines that communicate using MPI. The routine copy_faces exchanges boundary values between neighboring nodes. The routines {xyz}_send_solve_info, {xyz}_recv_solve_info, {xyz}_send_backsub_info, and {xyz}_recv_backsub_info form the core of the algorithm. Each routine performs line solves in the XYZ direction by first factoring the block-tridiagonal matrix into an upper triangular matrix, and then performing back substitution to solve for the unknown vectors of each line.

Of the 9672 message transfers in BT, 3219 appear normal. The other two major classes are late send post (931) and late recv wait (4958). Most of the late recv waits occur in the last five of six transfers. Interestingly, the structure of this routine issues all six MPI_Irecvs immediately before all six MPI_Isends. The routine then uses a MPI_Waitall function to complete these twelve operations. The first transfer is instantaneous, but then the following transfers almost always complete before the MPI_Waitall function completes. This strategy overlaps multiple communication operations, but it does not overlap any communication with computation. Both before and after this cluster of communication, BT uses deeply nested loops to pack and unpack the communication buffers. Decomposing these loops to take advantage of communication overlap may improve the communication performance, but risk of disabling compiler optimizations for these loops and disrupting efficient access of memory hierarchy.

In the routines {xyz}_send_solve_info and {xyz}_recv_solve_info appear normal, but {xyz}_send_backsub_info and {xyz}_recv_backsub_info often have late receive waits. Closer investigation of these routines revealed that they are part of a loop that computes and then communicates for the number of cells allocated to an MPI task. This compartmentalization of the messaging activity improves the software design of the code, but it also limits the possible opportunities for overlap of computation and communication.

As expected, the results for NAS SP are similar to NAS BT. The first message transfer of the copy_faces routine is normal, but the succeeding transfers are consistently classified as late recv wait. The classifications also reveal the different structure of the solver in the results for {xyz}_solv. The majority of message transfers for this subroutine are classified as late send post. With this evidence, a user could try to move the send's initiation forward in the control flow of the solver. Upon further examination, this solver does overlap communication and computation; however, the intricate code for this solver separates the respective sends and receives with data dependencies that prohibit shifting the location of the send initiation.

Application CG-Heat is a heat diffusion simulation that solves the implicit diffusion partial differential equations (PDEs) using a conjugate gradient solver over each timestep. This code is built on FORTRAN90 and MPI. CG-HEAT has a grid structure and its data access methods are designed to support one type of adaptive mesh refinement, although the benchmark code as supplied does not handle anything other than a single-level AMR grid.

The analysis of CG-HEAT exposes the MPI communication subroutines. This design limits the usefulness of the strategy for locating the application function responsible for particular message transfers; however, it does provide some insight into software design. Through closer examination, only two user routines call snd_r8 and rcv_asynch_r8. Both of these routines, faceget and faceput, exchange information with neighbor tasks. As with the inspection of NAS BT, CG-HEAT has its communication primitives buried in three levels of abstraction to improve portability and comprehension. Nonetheless, this abstraction makes it difficult to restructure the code to overlap this communication with computation.

Application SPPM benchmark solves a three-dimensional gas dynamics problem on a uniform Cartesian mesh, using a simplified version of the Piecewise Parabolic Method as described in Mirin, A. A., Cohen, R. H., et al., "Very High Resolution Simulation of Compressible Turbulence on the IBM-SP System," Proc. SC99: High Performance Networking and Computing Conf., ACM Press, 1999, hereby incorporated by reference. The algorithm makes use of a split scheme of X, Y, and Z Lagrangian and remap steps, which are computed as three separate sweeps through the mesh per timestep. Message passing provides updates to ghost cells from neighboring domains three times per timestep. The SPPM code is written in Fortran 77 with some C routines. The code uses asynchronous message operations: MPI_Irecv and MPI_Isend.

The results for SPPM are relatively well-balanced. The classifier judges 312 of the 480 (65%) messages as normal. A skeleton file automatically creates the routines {xyz}bdrys, and consequently, they have identical sender-receiver structure. The classifications exhibit regularly as well: the very last send-receive pair performs poorly when compared to the other 3 message transfers. These classifications make sense when reviewing the code structure of {xyz}bdrys. The code posts all MPI_Irecvs immediately, and stages the send initiations in four steps. Between consecutive sends, the routine packages the send buffer with deeply nested loops.

The method and system described herein uses a portable, extensible technique to provide automated guidance to users so that they can easily reason about the underlying causes of their application's communication inefficiencies. To extend the classes of recognizable performance phenomena, users may construct a microbenchmark that exhibits the problem, trace the microbenchmark, and regenerate the tests for the decision tree. It is unclear how a user would extend other tools to recognize new types of performance problems. With regard to portability, our approach is extremely portable because it adapts to target software and hardware configurations by observing communication operations empirically.

The foregoing is illustrative of the present invention and is not to be construed as limiting thereof. The invention is defined by the following claims, with equivalents of the claims to be included therein.

What is claimed is:

1. A method of performance analysis using machine learning comprising:
   generating a plurality of training records to model the behavior of a first application;
   creating a decision tree classifier having a plurality of tests based on the plurality of training records; and
   applying said decision tree classifier to a second application.

2. The method of claim 1, wherein the first application is a communication operation.

3. The method of claim 2, wherein said communication operation is an MPI.

4. The method of claim 1, wherein said plurality of training records include efficient and inefficient behavior.

5. The method of claim 1, wherein each of said plurality of training records include information about a communication message transfer.

6. The method of claim 1, wherein each of said plurality of training records include at least two attributes identifying a type of send operation and a type of receive operation.

7. The method of claim 6, wherein each of said plurality of training records further include at least five durations relating to transfer information.

8. The method of claim 1, wherein said second application is a communication application; and
the decision tree classifier categorizes the second application by location of sender and receiver.

9. The method of claim 1, further comprising:
verifying the plurality of tests by applying the decision tree classifier to the first application.

10. A system for performance analysis using machine learning comprising:
a microprocessor and memory configured to generated a plurality of training records to model the behavior of a first application;
the microprocessor and memory configured to create a decision tree classifier having a plurality of tests based on the plurality of training records; and
the microprocessor and memory configured to apply said decision tree classifier to a second application.

11. The system of claim 10, wherein the first system is a communication operation.

12. The system of claim 11, wherein the communication operation is an MPI.

13. The system of claim 10, wherein each of said plurality of training records include at least two attributes identifying a type of send operation and a type of receive operation.

14. The system of claim 10, wherein said second application is a communication application; and
the decision tree classifier is designed to categorize the second application by location of sender and receiver.

15. A system of performance analysis using machine learning comprising:
a means for generating a plurality of training records to model the behavior of a first application;
a means for creating a decision tree classifier having a plurality of tests based on the plurality of training records; and
a means for applying said decision tree classifier to a second application.

16. A computer readable medium having instructions for performance analysis using machine learning comprising:
said instructions configured to generated a plurality of training records to model the behavior of a first application;
said instructions configured to create a decision tree classifier having a plurality of tests based on the plurality of training records; and
said instructions configured to apply said decision tree classifier to a second application.

17. A computer readable data transmission medium having a data structure for performance analysis using machine learning comprising:
said data structure configured to generated a plurality of training records to model the behavior of a first application;
said data structure configured to create a decision tree classifier having a plurality of tests based on the plurality of training records; and
said data structure configured to apply said decision tree classifier to a second application.

18. A method comprising:
generating a plurality of training records to model the behavior of a first application;
creating a decision tree classifier having a plurality of tests based on the plurality of training records; and
applying said decision tree classifier to a second application.

19. The method of claim 18, wherein each of said plurality of training records include at least two attributes identifying a type of send operation and a type of receive operation.

20. The method of claim 18, further comprising:
performing a performance analysis of the second application.

* * * * *